United States Patent [19]

Hitomi

[11] Patent Number: 4,817,267
[45] Date of Patent: Apr. 4, 1989

[54] TOOL CHANGE APPARATUS FOR MACHINING CENTER AND THE LIKE

[75] Inventor: Shinichi Hitomi, Yatomi, Japan

[73] Assignee: Howa Machinery, Ltd., Aichi, Japan

[21] Appl. No.: 86,871

[22] Filed: Aug. 19, 1987

[30] Foreign Application Priority Data

Aug. 20, 1986 [JP]  Japan ................................. 61-194894

[51] Int. Cl.$^4$ ............................................. B23Q 3/157
[52] U.S. Cl. ........................................ 29/568; 279/79;
409/233
[58] Field of Search ...................... 29/568; 279/79, 97;
409/231, 232, 233

[56] References Cited

U.S. PATENT DOCUMENTS

| 3,215,445 | 11/1965 | Benjamin et al. | 279/97 |
| 3,791,022 | 2/1974 | Kurimoto et al. | 29/568 |
| 4,117,586 | 10/1978 | Uchida et al. | 29/568 |
| 4,122,755 | 10/1978 | Johnson et al. | 409/233 |
| 4,304,513 | 12/1981 | Roch | 409/233 |

FOREIGN PATENT DOCUMENTS

| 55-58941 | 5/1980 | Japan . | |
| 33207 | 4/1981 | Japan | 409/231 |
| 57-61441 | 4/1982 | Japan . | |
| 127641 | 8/1982 | Japan | 29/568 |
| 45836 | 3/1983 | Japan | 29/568 |
| 59-53136 | 3/1984 | Japan . | |

Primary Examiner—Gil Weidenfeld
Assistant Examiner—Daniel W. Howell
Attorney, Agent, or Firm—Wenderoth, Lind & Ponack

[57] ABSTRACT

A tool change apparatus for a machining center and the like comprises a spindle head vertically slidably mounted on a column, and a spindle rotatably mounted in the spindle head. The spindle has at the lower end thereof a tapered tool reception bore in which a tool is releasably held. When a draw bar is shifted upwards, resilient clamper arms are forced to enter a reduced bore to be contracted thereby so that a head of the tool is clamped. When the draw bar is shifted downwards, engageable end portions are moved into an enlarged recess-like portion whereby the clamper arms are allowed to expand outwards to release the head of the tool. Even when the head is released, a stop pin urged by a spring continues to engage the head of the tool whereby the tool is still held by the spindle.

Tools are held by a series of magazine pots. Each pot is indexed to a tool change station. A tool change shaft has two oppositely extending pairs of tool change arms which function to transfer tools between an indexed tool pot and the spindle.

14 Claims, 11 Drawing Sheets

TOOL CHANGE APPARATUS FOR MACHINING CENTER AND THE LIKE

BACKGROUND OF THE INVENTION

1. Field of the Invention

This invention relates to tool-change apparatuses for a machining center and the like.

2. Prior Art

A representative example of the prior art tool change apparatuses is described in Japanese Laid-Open Patent Publication, unexamined, No. Sho-59-53136.

In this prior art apparatus, a spindle head slidably mounted on a column mounts the spindle rotatably. The spindle is formed with an axially extending operation bore, through which extends a draw bar arranged axially slidable and adapted for use in tool clamping purposes. By shifting the draw bar in one sliding direction, the tool inserted into and held in position is subjected to clamping, while, by shifting the draw bar in the opposite sliding direction, the said tool is unclamped. The tool-unclamping operation by the draw bar is always carried out, only after firm gripping of the tool by a pair or pairs of tool change arms mounted pivotably on the tool change shaft.

Another prior art apparatus is disclosed in Japanese Laid-Open Patent Publication, unexamined, No. Sho-55-58941. In this prior art arrangement, a tool change shaft, having change arms mounted therein, is arranged on a column or spindle head in such a way that after moving of the spindle head to a predetermined tool change station, the change shaft is rotated and the change arms are operated so as to allow the change arms to grip a spindle tool and a pot-held tool.

In a still another prior document, Japanese Laid-Open Patent Publication No. Sho-57-61441 is described an apparatus, wherein the column shiftably mounts a change shaft provided with two sets of mutually closable and openable change arms. After shifting of the spindle head to a predetermined change station, the change shaft is shifted and the change arms are operated to grip the spindle tool.

As stated above, in the prior art, tool change operation is carried out by unclamping the tools after the change arms have gripped the tools, withdrawing the tools by the arms, rotating the change shaft and then inserting new tools by the arms for subsequent clamping. Therefore, the clamping and unclamping operations are needed for tool change, which causes delay in the operation signals and a prolonged tool change time period.

Further, since the exchange shaft is rotated and shifted for gripping of tools after the spindle head has reached a predetermined tool change station, a time delay for generation and transfer of signals for related operational machine units and parts occurs during the rotary and shifting movements of the tool change arms, which gives rise to prolongation of time required for tool change.

SUMMARY OF THE INVENTION

It is an object of this invention to provide an improved tool changer for a machining center or the like wherein in the case of a tool change operation, the tool held by the spindle can be unclamped in advance of gripping the tool by the change arms.

Still another object is to provide an improved tool changer for a machining center or the like wherein after release of the tool from the grip by the change arms, the tool may be brought into a clamped state by the spindle.

In the present invention, the spindle is provided with provisional clamping means for clamping and unclamping the tool held in a tool-receiving and mounting recess or bore to allow engagement and disengagement of the tool with and from the spindle, respectively. In the case of tool change, in advance of the tool being gripped by change arms, the tool is unclamped beforehand, and only after clamp-release of the tool by change arms, can the tool be subjected to clamping, as a salient feature of the invention Further, in the present invention, a tool magazine is provided which includes a number of tool holding pots, or briefly tool pots, for holding therein respective tools, which pots are selectively shiftable to a predetermined tool change station or —position and in parallel to the spindle. A change shaft is mounted on the spindle head in such a way that it is mounted at an intermediate position between said spindle and the tool pot positioned at the tool exchange station to be rotatable as well as shiftable axially in parallel with the spindle. The change shaft is provided with two pairs of tool change arms, or briefly change arms, of which a pair of arms project generally in opposition to another pair of arms and are closable towards each other and openable away from each other. Upon moving the spindle head to a predetermined tool change station or position, the one pair of arms and the other pair of arms of the said two pairs are positioned in such respective positions that said one pair can nearly or precisely engage from both sides the tool provisionally fitted to the spindle, while said other pair can nearly or precisely engage from both sides the tool provisionally mounted in one of the tool pots.

When a tool is inserted in the tool-mounting recess or tapered bore attributed fixedly to the spindle, a small engageable head portion of the tool, called a "pull stud", is engaged by the provisional clamping means for establishing and assuring a slip proof connection. When a draw bar is shifted in one direction while the tool is held in position in the said mounting recess or bore, the tool is brought into a clamped state. On the contrary, when the draw bar is shifted in the opposite direction while the related tool is held and clamped in the above manner, the tool is unclamped. Even in the unclamped state of the tool under consideration, the latter is held in position under the action of said provisional clamp means.

Therefore, it will be seen, according to this invention, that in advance of a tool gripping operation by means of tool change arms, it is possible to hold the tool under consideration in an unclamped state.

Further, one side pair of tool change arms are positioned at both sides of the tool attached provisionally to the spindle and the machining operation is carried out under these operating conditions. When the spindle head is shifted to the predetermined tool change station or position, the other pair of tool change arms are positioned at both sides of a tool held in the tool mounted pot, or briefly tool pot, preparatorily positioned at the tool change station or position. Thus, directly after execution of a shifting movement of the spindle head to the predetermined station or position, the both pairs of change arms can be instantly closed for gripping both the tools held on the spindle and in the preparatorily positioned tool pot, and the tool change operation can be carried out under this optimum operating condition. Thus, the tool change operation can be performed in a highly convenient and economical manner, as may be expected.

These and further objects, features and merits of the invention will become more apparent when reading the following detailed description of a preferred embodiment of the invention with reference to the accompanying drawings.

DETAILED DESCRIPTION OF THE INVENTION

Figure 1:
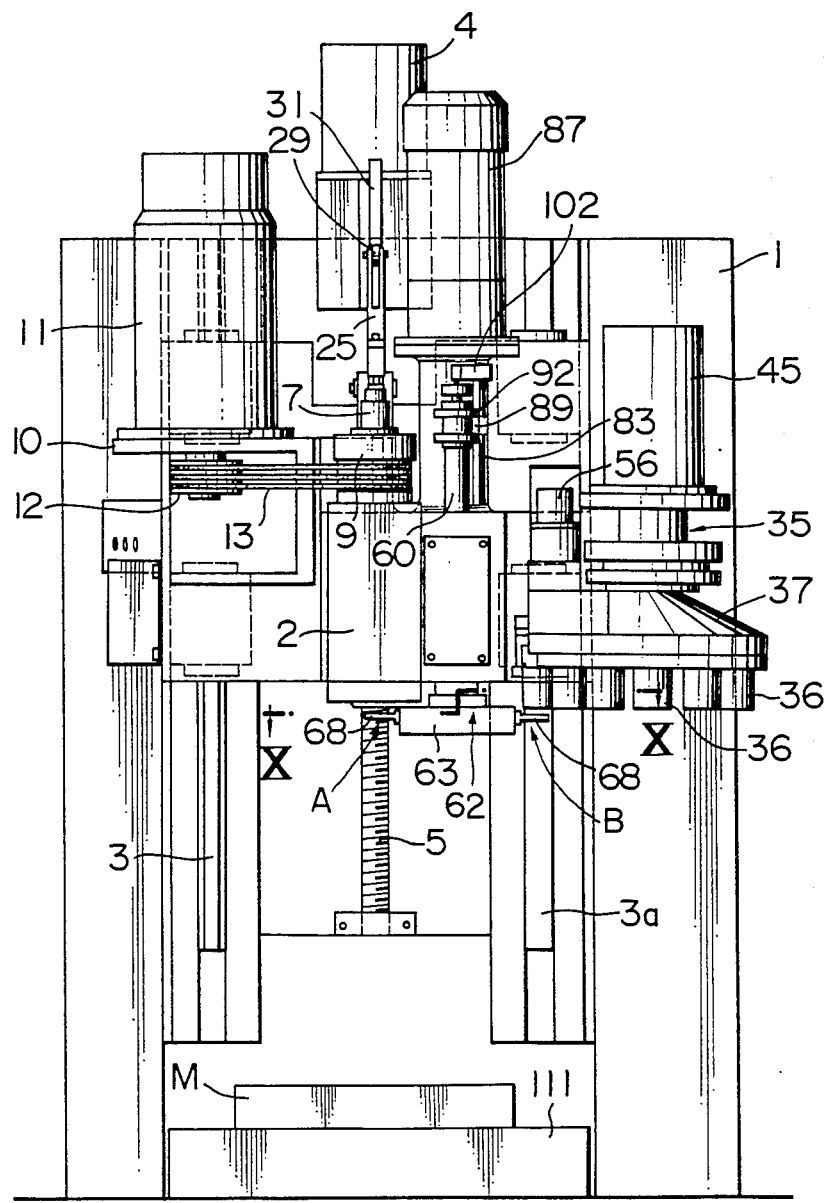
FIG. 1 is a front view of a preferred embodiment of the machining center according to the invention.

In the drawings is shown a preferred embodiment of the invention, as applied to, a vertical type machining center.

Figure 2:
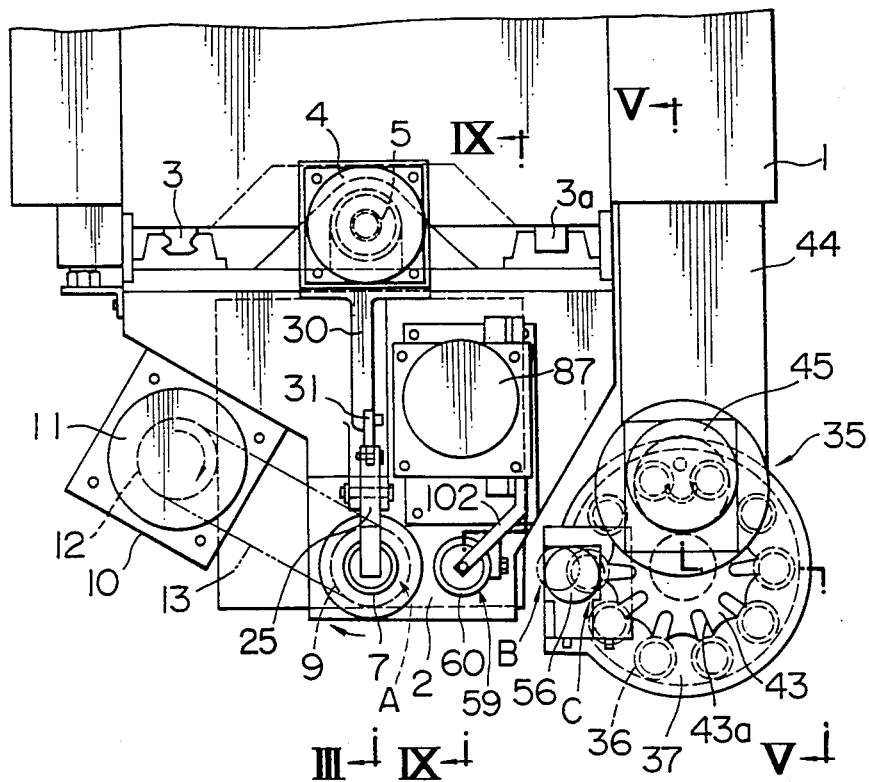
FIG. 2 is a top plan view of essential parts of the embodiment shown in FIG. 1.
Figure 3:
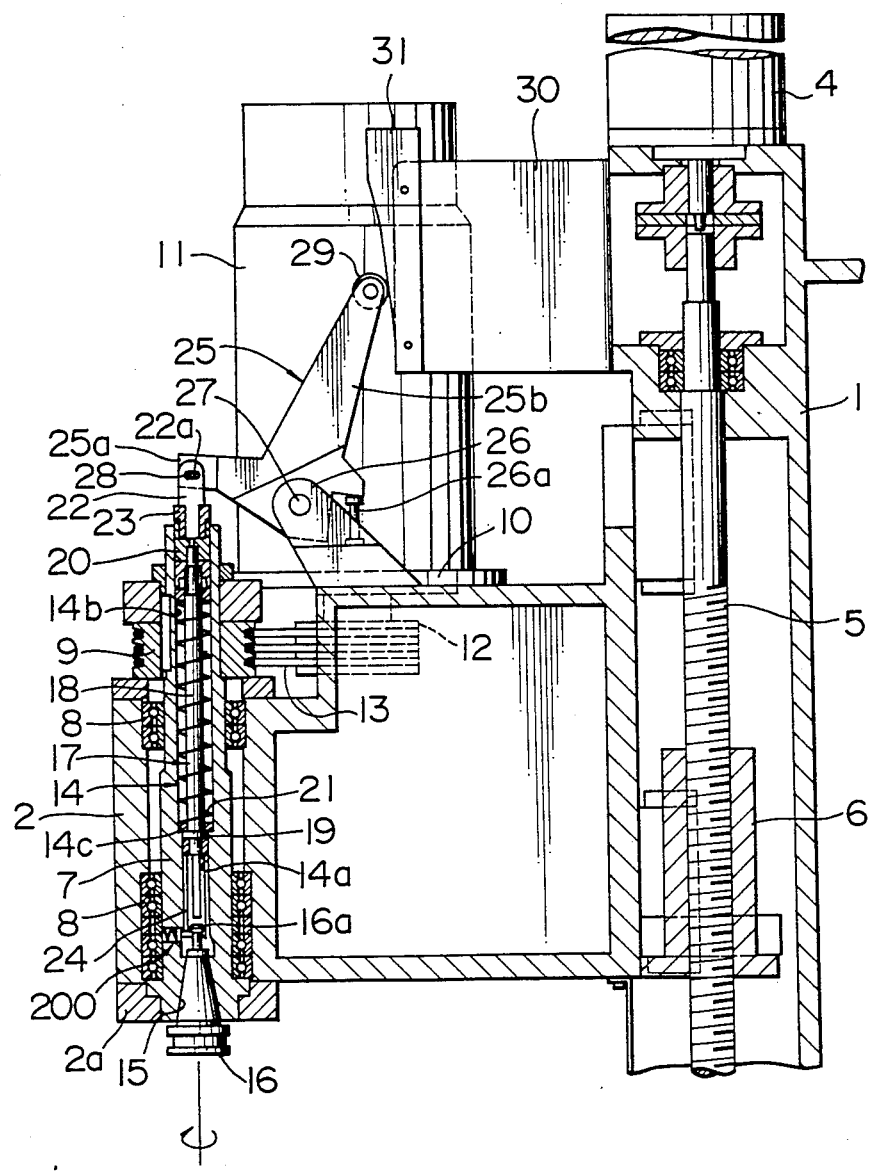
FIG. 3 is an enlarged section view of the machining center taken along a section Line III—III shown in FIG. 2.
Figure 4:
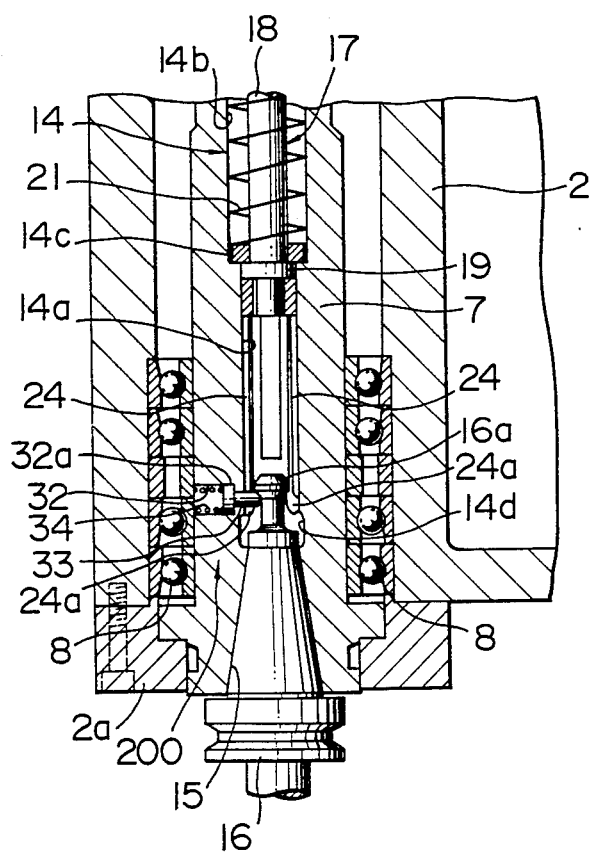
FIG. 4 is an enlarged view of part of the apparatus shown in FIG. 3.

In FIGS. 1 and 2, numeral 1 represents a column, and 2 represents a spindle head mounted slidably on a pair of guide rails 3 and 3a extending vertically in parallel with each other. As most specifically shown in FIG. 3, numeral 4 represents an elevating motor which drives a vertically extending screw shaft 5 which is kept in engagement with a ball screw member 6, the latter being thereby driven up or down by the revolution of the screw shaft 5 in one direction or the other, respectively, for moving the spindle head 2 up or down correspondingly, as is highly well known among those skilled in the art. As shown in FIGS. 3 and 4, the spindle head 2 carries a downwardly extending spindle 7 through the intermediary of bearings 8, a slip-out prevention member 2a being provided for assuring the spindle 7 is held in position. A driven pulley 9 is keyed to the spindle 7 and is arranged to rotate exclusively in one direction through a belt 13 from a drive pulley 12 fixedly attached to a drive motor 11 mounted on a bracket 10 fixedly attached to the spindle head 2. The spindle 7 is provided axially with a main and operation bore 14 extending along a substantial length of the spindle, a tool inserting, tapered bore 15 being formed in downward continuation of the operation bore 14 and through the intermediary of a reduced bore 14a. Within the operation bore 14, there is slidably mounted a draw bar 17 which is reciprocable up-and-down. This draw bar 17 serves for clamping a tool 16 in the tapered bore 15 and unclamping it therefrom, as will be more fully described hereinafter. The draw bar 17 consists of a main body 18 and a slide portion 19 made integral therewith and slidable in the reduced bore 14a. 20 represents a slide which is fixedly attached to the upper end of main body 18 of the bar 17 and slidably mounted in large diameter portion 14b of the operation bore 14. The slide 20 is urged elastically by a coil spring 21 inserted between a shoulder 14c of operation bore 14 and the slide 20. Numeral 22 is a connection piece rotatably fitted through a bearing 23 to the slide 20, and connected through a slot 22a with an operating lever to be described. 24 represents a pair of springy clampers fixedly attached to the main body 18 and provided at lower ends thereof with respective engageable portions 24a. When the main body takes such a raised position that the said engageable end portions 24a move into the large diameter portion 14d of operation bore 14, the engageable head 16a, generally called the "pull stud", of a tool 16 which has substantially been introduced into the tapered reception bore 15 is positioned ready for engagement with the engageable end portions 24a of clampers 24. On the other hand, when the main body 18, accompanying other parts of draw bar 17, is so positioned that the engageable end portions 24a have been moved upwards into the reduced diameter portion 14a, and brought finally into engagement with the tool head 16a, the tool 16 is clamped in service position.

Next, numeral 25 represents an operating lever formed preferably into a bell crank lever as shown, rotatably mounted on a pivot pin 27 on a support lever member 26 projecting from the spindle head 2. Arm 25a of the operating lever 25 carries fixedly a projecting pin 28 which is kept in loose engagement with slot 22a on the connecting piece 22, while the tip end of another arm 25b carries rotatably a follower roller 29.

When spindle head 2 elevates, this follower roller 29 is brought into contact with a cam 31 which is positionally adjustable through a bracket 30 on the column. On the support arm 26, a stopper bolt 26a is provided fixedly and serves for receiving the rotary motion of operating arm 25 under the action of spring 21 during lowering movement of spindle head 2.

As shown in FIG. 4, the spindle 7 is provided with a spring-urged provisional clamp means 200 in a slightly and laterally projecting mode into the lower end of the reduced diameter bore 14a. This provisional clamp means 200 is slidably mounted in a lateral bore 32 formed in the material of spindle 7 and extending in the perpendicular direction relative to the central axis, not shown, of the latter.

In the lateral bore 32, a stop pin 33 is provided movably along the center line, not shown, of the bore 32. The stopper pin 33 is flanged and backed-up with a spring 34 so as to be resiliently urged to move towards the center line, not shown, of the spindle 7, the tip end of the stopper pin protruding into the reduced bore 14a and being kept in pressure contact with shoulder 32a by the flange of the stopper pin. The front end of the protruding stopper pin 33 is rounded as shown specifically in FIG. 4 and normally kept in pressure contact with a neck portion formed underneath the engageable head 16a of the tool 16 when the latter has been disengageably set in position in the tapered bore 15. If desired, spring-urged ball click means or the like may be used in place of the foregoing stopper pin, for locking and unlocking of the tool.

Next, referring to FIGS. 1, 5, 6, 7 and 8, numeral 35 represents a tool magazine mounted on the column 1 and adapted for selective transfer of a plurality of tool pots 36 individually storing respective tools to the desired tool change station "B".

Figure 5:
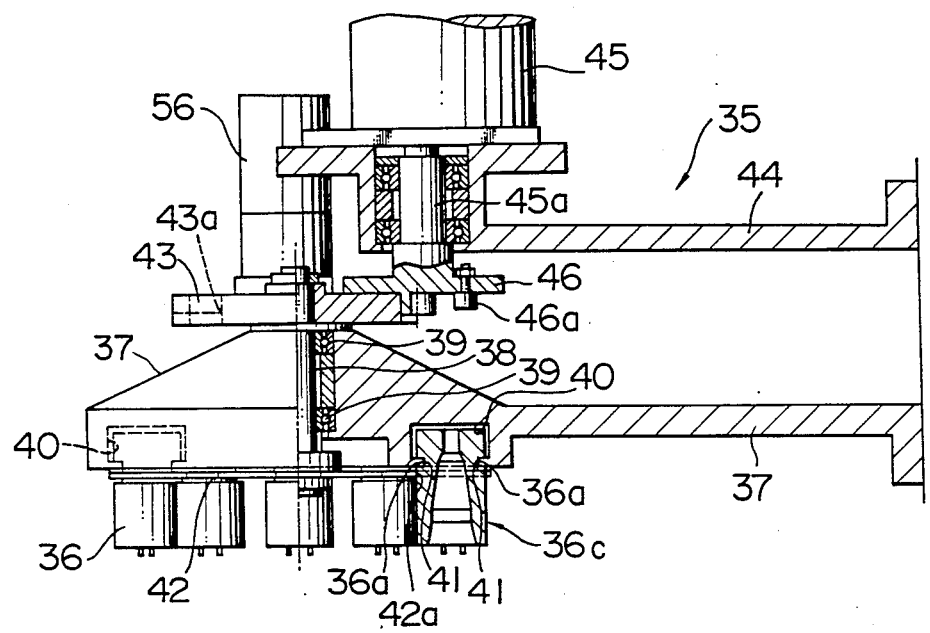
FIG. 5 is an enlarged section view of several parts of the apparatus shown in FIG. 2 and taken along a section line V—V shown therein.
Figure 6:
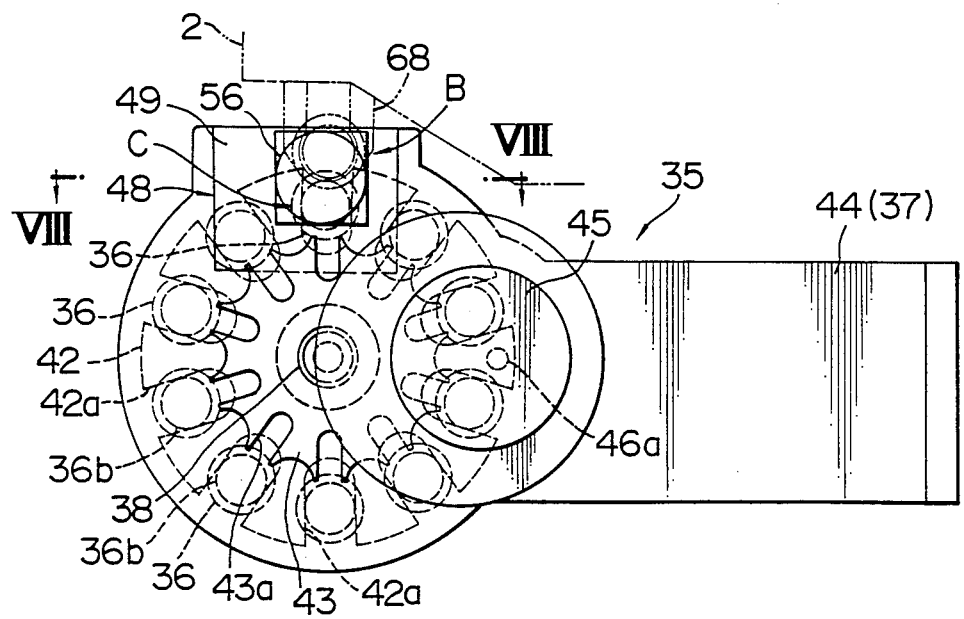
FIG. 6 is a top plan view of FIG. 5.

In this magazine 35, numeral 37 represents a magazine proper fixedly mounted on column 1, a vertically extending rotatable shaft 38 being mounted through bearing units 39 at the tip end portion of the magazine proper 37. On the lower surface of the magazine proper 37, a concentric guide groove 40 is formed at a certain radial distance from the rotatable shaft 38. At the lower ends of opposing walls or webs defining this guide groove 40, a pair of opposing flanges 41 are formed, so as to engage with an engageable outer groove 36a formed on each of the tool pots 36, for guiding the latter in downwardly suspending state. At the lower end of the rotatable shaft 38, a round disk plate 42 is fixedly attached, radially extending engageable recesses 42a being formed on the disk plate 42 at equal peripheral distances to serve for indexing operations. These engageable recesses 42a are kept in engagement with respective ring recesses 36b formed on tool pots 36 which are being guided by circular guide groove 40. At the upper end of rotatable shaft 38, as shown in FIGS. 5 and 6, a Geneva wheel 43 having a plurality of peripheral recesses 43a is fixedly attached by a key. Numeral 44 shows a bracket fixedly mounted on column 1, a downwardly directed indexing motor 45 being fixedly mounted on the bracket 44. Motor shaft 45a carries fixedly a drive wheel 46 which carries rotatably a roller 46a engageable with engageable recesses 43a successively. Numeral 47 represents a radial recess formed on the magazine proper 37 at an indexing position C in opposition to a tool change position B, the guide groove 40 being thereby kept open. Numeral 48 represents a supporting body fixedly mounted on magazine proper 37 at a higher level than said recess 47 and composed of a supporting body proper 49 having at its lower surface a container recess 49a arranged in opposition to said recess 47 and a guide member 50 fixedly attached to the supporting body proper 49 in an inwardly projecting manner from the both side edges of the container recess 49a. The container recess 49a and the radial recess 47 constitute in combination a guide passage 51.

Numeral 52 represents a tool transfer member which is movable in the radial direction in the guide passage 51 and provided with a pair of slidingly engageable recesses 52a with the guide member 50. This tool transfer member 52 is provided with a reception groove 53 and an engageable portion 54, said groove 53 practically representing a continuation of the guide groove 40 and said portion 54 being practically in continuation of said engageable portion 41 when seen in the receded position of the tool transfer member 50 shown in full lines in FIG. 7. When tool pot 36 is brought indexingly to the position C, the engageable portion 54 is brought into engagement with an engageable groove 36a for supporting the tool pot 36 under consideration.

Figure 7:
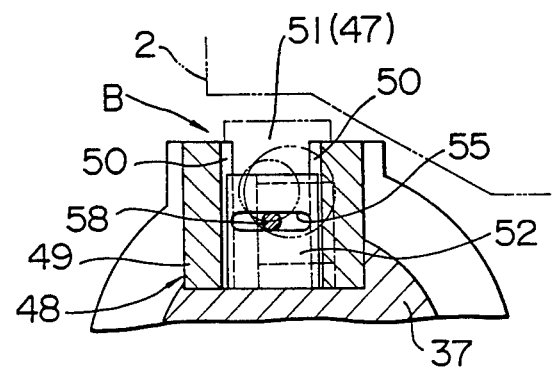
FIG. 7 is a section view of several components shown in FIG. 6.
Figure 8:
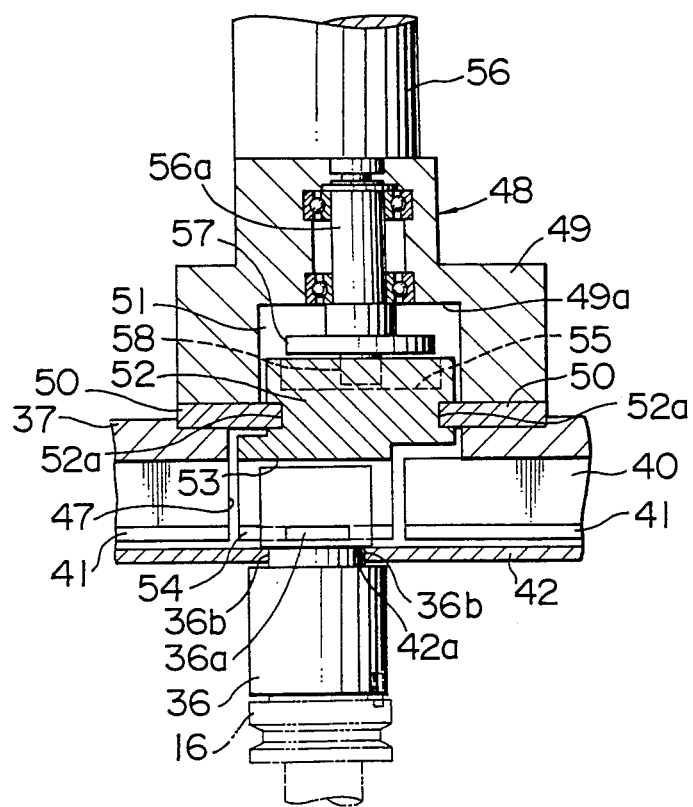
FIG. 8 is an enlarged section view taken along a section line VIII—VIII shown in FIG. 6.

Tool transfer member 52 is provided at its upper surface with a recess 55 as shown in FIGS. 7 and 8.

Numeral 56 represents a transfer motor fixedly mounted on supporting member 49 and having a depending output- or motor shaft 56a which has fixedly attached a crank 57 having a crank pin 58 kept in slidable engagement with said recess or groove 55. With rotation of the motor shaft 56a, the transfer member 52 is shifted to the advanced position shown by phantom lines in FIG. 7, thereby a tool pot destined at present for tool change service being transferred to the tool change station B.

Numeral 59 represents a change unit adapted for tool changing between the spindle 7 at tool change station A and the tool pot 36 situated at tool change station B. The detailed structure of the change unit 59 is shown in FIGS. 9-16.

More specifically in FIGS. 1 and 2, numeral 60 represents a change shaft which is rotatably and axially shiftably mounted in bearings 61 provided on the spindle head 2. As seen, the change shaft 60 is arranged in parallel with the spindle 7 and at an intermediate position between the latter and the tool pot 36 under consideration. At the lower end of change shaft 60, a change head 62 is provided. A pair of change heads as at 62 are arranged mutually in symmetry, as may be specifically supposed from FIG. 10. In the following description, however, only one side change head 62 will be illustrated in detail, while the structure and function of the other similar head can be well understood with reference to same reference numerals attached to the structural components thereof.

Figure 10:
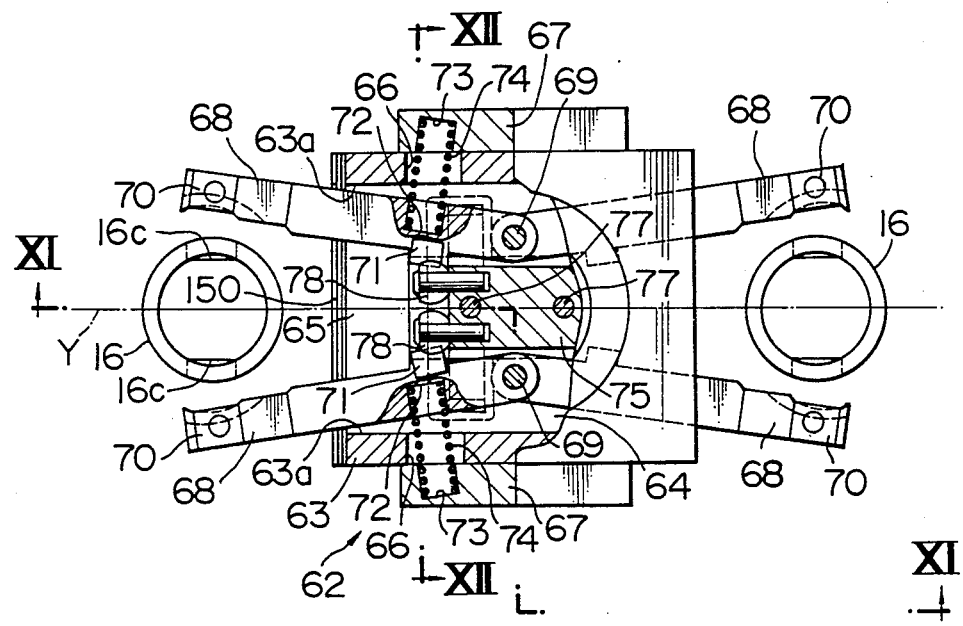
FIG. 10 is an enlarged section view taken along a section line X—X shown in FIG. 1.
Figure 12:
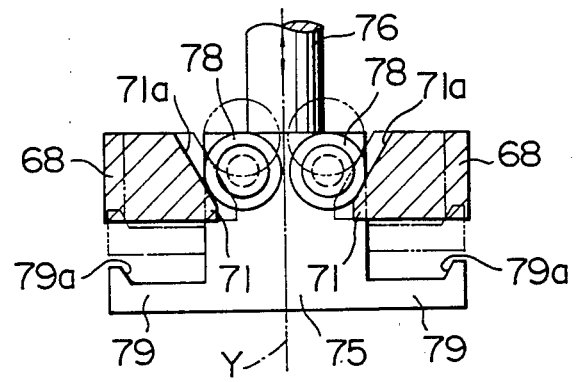
FIG. 12 is an enlarged section view taken along a section line XII—XII shown in FIG. 10.

In each of these change heads 62, numeral 63 represents a head proper which is fixedly, attached to the lower end of change shaft 60 and provided with a container chamber 64 and an arm guide opening 65, the former 64 being open at the tip end as shown in FIG. 10. Each side wall 63a of the arm guide opening head proper 63 is provided with a perforation 66, as shown in FIG. 10, and a spring mount 67 is attached fixedly onto the outer surface of each side wall 63a. The ends of change arms 68 inserted in respective guide openings 65 are inserted and pivotably mounted at 69, so as to execute a pivotal opening and closing function as a pair. The pivot pins 69 pivotably mount simultaneously the other and oppositely provided pair of change arms also marked with 68 as above. Each of these change arms 68 is provided fixedly with a gripper 70. Each pair of grippers 70 serve for gripping a related one of tools 16 by engaging with a pair of recesses 16C of the related tool 16 and thereby holding the latter while keeping it at a predetermined rotational position. At an intermediate position between both ends of each change arm 68 and at the inside wall surface, a cam piece 71 acting as a cam member is fixedly mounted, as shown in FIG. 12. The cam surface 71a of each cam piece 71 is inclined in such a way that, when seen from below to above in FIG. 12, the surface 71a diverges from the imaginary center line Y around which each acts as the center for opening and closing pivotal movement of the change arm 68. On the outside surface of each change arm 68 and at an intermediate point between the both ends thereof, a spring-mounting recess 72 is formed. Between the both opposing recesses 72 and 73, a holding spring 74 is held in compression, thereby each pair of change arms 68 being urged in the mutually closing direction. In this way, the inclined cam surfaces 71a are urged to keep contacting with the related cam followers to be set forth.

In the container chamber 64 of the head proper 63 and between a pair of swingable change arms 68, an operating member 75 is arranged in a vertically movable way. This operating member 75 is fixedly attached to an operating shaft 76 which is slidably mounted in an axial hollow bore 60a (FIG. 11) of change shaft 60 and guided to slide up-and-down by a guide pin 77 fixedly attached to head proper 63. On the side surface of operating member 75, a pair of cam members, preferably cam followers 78, are rotatably mounted and kept in contact with respective cam surfaces 71a. When operating shaft 76 is caused to elevate in FIG. 12, the pair of change arms 68 are closed toward each other, while, when operating shaft 76 slides downwards, these change arms 68 are moved in the mutually opening directions.

Figure 9:
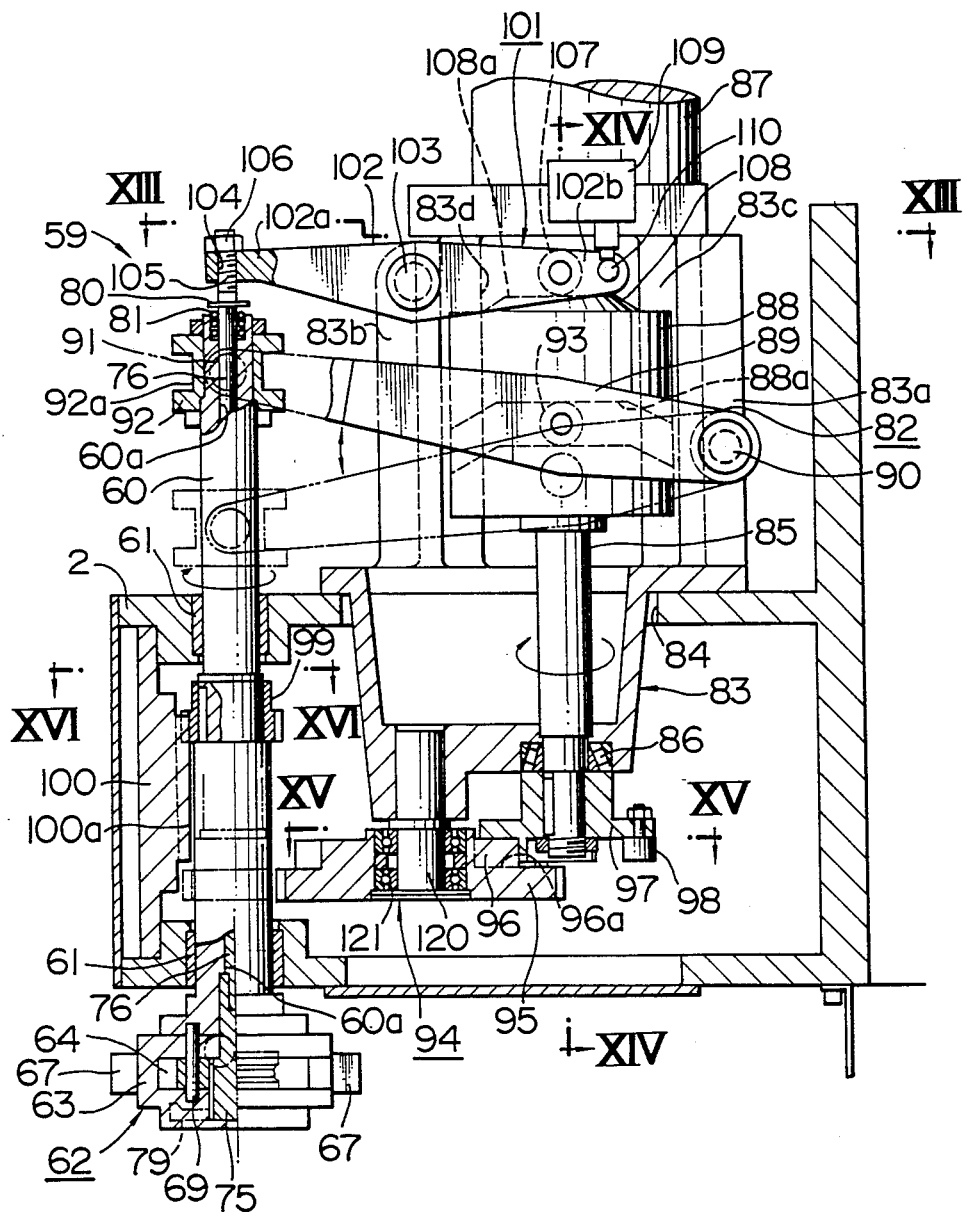
FIG. 9 is an enlarged section view taken along a section line IX—IX shown in FIG. 2.

At the lower end of operating member 75, a pair of engageable pieces 79 are provided integrally and in oppositely projecting manner, as shown in FIG. 12, and in the position at a lower level than the change arms 68, respectively. Engageable pieces 79 are formed with respectively inclined tip end upper surfaces 79a which are so shaped that, when going upwards and in opposition to outermost and lower portions of closed change arms 68, the distances from the center line Y to the surfaces 79a; 79a are increased. These inclined surfaces 79a are arranged in symmetry relative to the said center line Y. Thus, when operating shaft 76 is elevated, inclined surfaces 79a are brought into engagement with respective change arms 68, to establish and maintain the latter in the closed locked position, relative to the said center line Y. As shown in FIG. 9, the operating shaft 76 is provided at the top end with a spring mount 80 and a spring 81 is inserted between the latter and change shaft 60. Numeral 150 represents a shield plate for preventing intrusion of dust.

Figure 13:
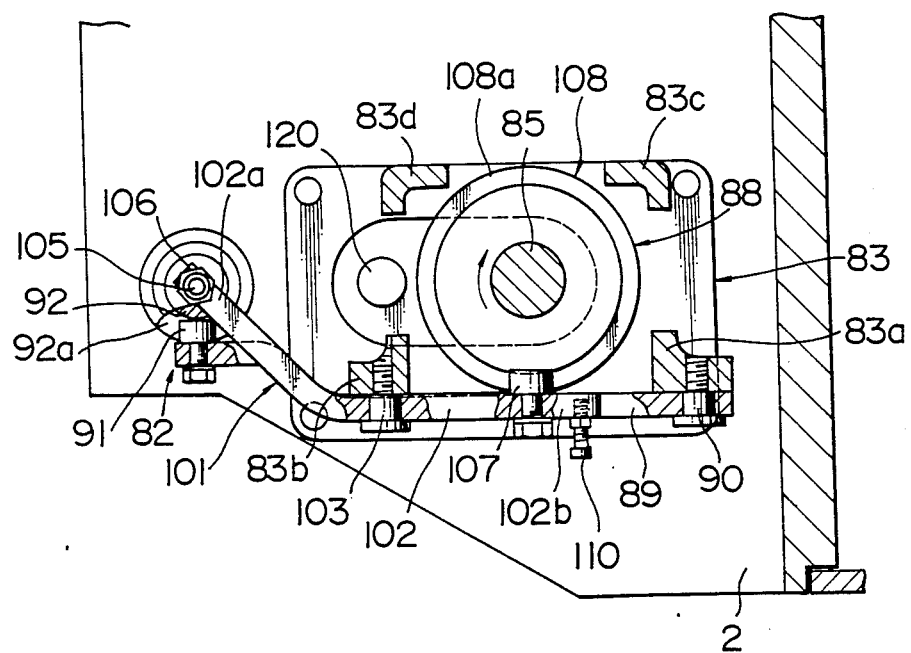
FIG. 13 is a partially broken away, section view taken along a section line XIII—XIII shown in FIG. 9.

Numeral 82 represents an elevator adapted for moving said change shaft 60 up and down. The detailed structure thereof is shown in FIGS. 9, 13 and 14 in combination.

In the elevator 82, numeral 83 represents a hollow supporting bracket which is rigidly supported on the upper surface of spindle head 2 and the lower portion of bracket 83 is introduced through an opening 84 on the said upper surface into the interior surface of spindle head 2 for being contained therein.

Figure 14:
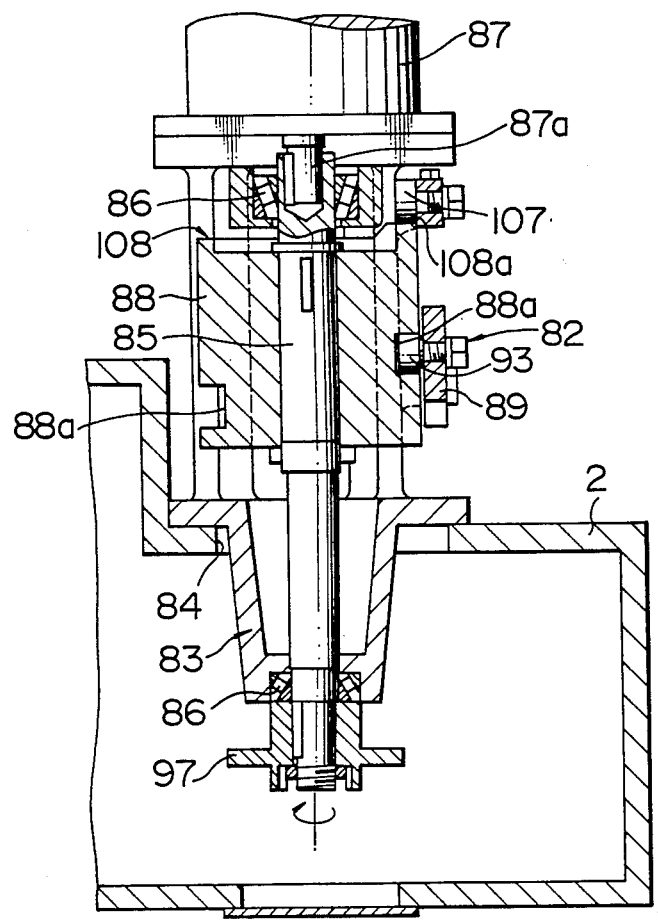
FIG. 14 is a section view taken along a section line XIV—XIV shown in FIG. 9.
Figure 16:
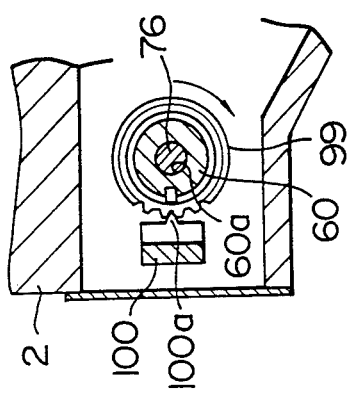
FIG. 16 is a section view taken along a section line XVI—XVI shown in FIG. 9.

Numeral 85 represents a vertically extending shaft which is rotatably supported through bearings 86 on the supporting bracket 83, the upper end of said shaft 85 is rigidly connected with output shaft 87a of a drive motor 87, FIG. 14, for performing unitary rotation therewith, the said motor 87 being fixedly mounted on the supporting bracket 83. At an intermediate position between the both ends, the shaft 85 is keyed with a cylindrical cam 88 having a cam groove 88a on the peripheral surface thereof, said cylindrical cam being arranged, as shown in FIG. 13, within an imaginary area as defined by four legs 83a; 83b; 83c and 83d of supporting bracket 83. On one of the rear legs, 83a, of bracket 83, there is provided a pivot pin 90, the root end of a cam lever 89 is mounted pivotably thereon for movement up-and-down in FIG. 13, while the cam lever 89 carries on its tip end rotatably a roller 91 which is kept in engagement with a ring groove 92a formed on an engageable member 92 fixedly mounted on top of the change shaft 60 set forth above. At an intermediate position between the both ends of cam lever 89, cam follower 93 is rotatably mounted thereon and kept in engagement with said cam groove 88a. The latter groove acts in such a way that with a complete revolution of cylinder cam 88, the cam lever 89 makes a pivotal movement to a place as shown in FIG. 9 by phantom lines, thereby the change shaft 60 being lowered provisionally a predetermined distance.

Figure 15:
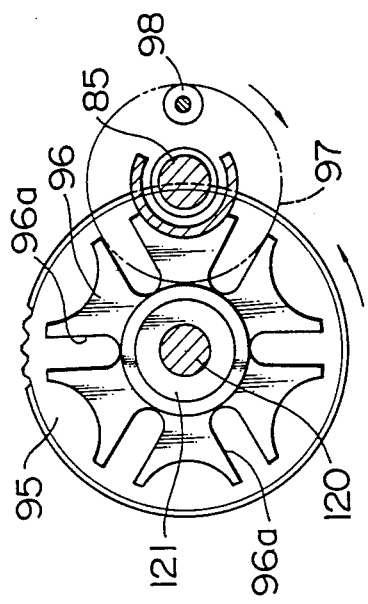
FIG. 15 is a section view taken along a section line XV—XV shown in FIG. 9.

Numeral 94 is a rotation drive unit, the details of which are shown in FIG. 9 and FIGS. 14–16. In this unit 94, 95 represents an intermediate gear, which is rotatably mounted through a supporting shaft 120 fixedly attached on the bottom of said support bracket 83; and bearings 121. Numeral 96 represents a Geneva wheel integral with the intermediate gear 95 having a plurality of outwardly opened engageable recesses 96a, as shown in FIG. 15. 97 represents a drive wheel keyed to rotatable shaft 85 at the lower end thereof and carries a roller 98 engageable with said recesses 96a in succession.

99 represents a follower pinion keyed to the change shaft 60 at an intermediate position between the ends thereof. With the change shaft 60 brought to its lowest position under the action of elevator device 82, the follower pinion 99 is brought into engagement with said intermediate gear 95. On the other hand, when change shaft 60 is elevated from its lowermost position, the follower pinion 99 is brought out of engagement with the hitherto meshing intermediate gear 95. The gear ratio between pinion 99 and intermediate gear 95 has been so preset that with a complete full revolution of the rotatable shaft 85 in the direction shown by an attached arrow, change shaft 60 is rotated by just a half revolution shown by an attached arrow. 100 represents a rotation checker attached fixedly to spindle head 2 having a ridge projection 100a engageable with one of tooth grooves formed on the follower pinion 99, as shown specifically in FIG. 16. With the change shaft 60 elevated from its lowermost position, the projection 100a is brought into engagement with a tooth groove on follower pinion 99, thereby the latter being blocked from free rotation.

Numeral 101 represents an arm-closing and opening unit for operating the change arms 68 by shifting the operating shaft 76 in the axial direction. The structural details of the unit 101 will be set forth with reference to FIGS. 9, 13 and 14. In this unit 101, numeral 102 represents a cam lever which is pivotably mounted at an intermediate position between the ends by a pivot pin 103 on the aforementioned leg 83b, while the front end 102a of the cam lever is provided with a tapped hole 104. A contact bolt 105 is screwed in the tapped hole 104 and fixedly attached by tightening a nut 106, said bolt 105 being contactable with the top end of operation shaft 76. At the rear end portion 102b of cam lever 102, a cam follower 107 is rotatably mounted and kept in pressure engagement under pressure of spring 81 with cam surface 108a of a face cam 108 formed on the upper end surface of said cylinder cam 88. The cam surface 108a is normally to act upon the cam follower 93, the latter being thereby kept at a raised position adapted for keeping the change arms 68 in the opened position. With rotation of rotatable shaft 85, the cam follower 93 is allowed to lower to an intermediate rotation range and for closing the change arms 68. Numeral 109 represents a sensor to sense the opened state of the change arms 68. For performing this sensing job a sensor a projecting pin 110 is mounted fixedly on cam lever 102.

Figure 17:
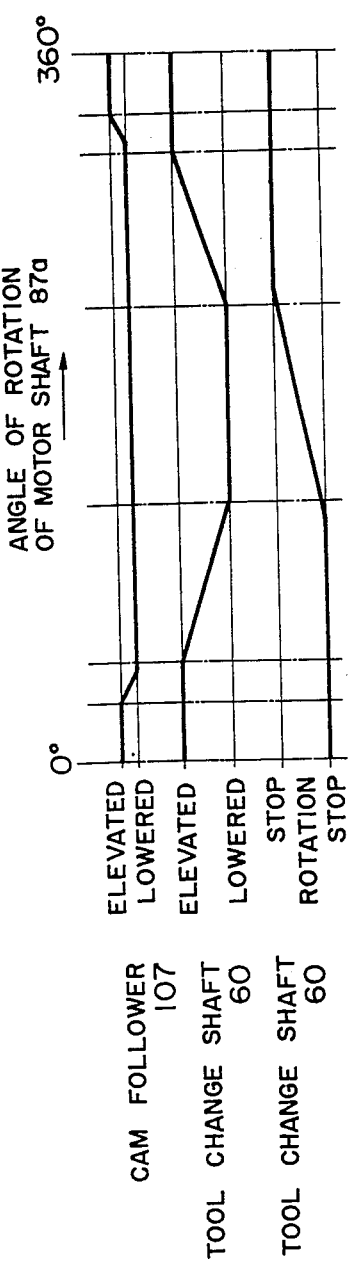
FIG. 17 is an operation chart showing operation modes of several main working parts of the machine.

Operations of elevator unit 82, rotating unit 94 and arm-closing and opening unit 101 are closely corelated one after the other schematically shown by a timing chart shown in FIG. 17. Additionally, in FIG. 1, 111 represents the work table.

OVERALL OPERATION OF THE MACHINE

In the following, the overall operation of the machine will be set forth in detail:

Before initiation of machining jobs, the tool pots 36 of tool magazine 35 are provided with respective kinds of tools 16 as wanted, and the tool-positioning and mounting tapered bore 15 of spindle 7 is fitted with a certain required kind of tool, although shown by the same reference numeral 16.

Next, for machining the work M on the work table 111, the elevating drive motor 4 is energized to rotate screw shaft 5 so as to lower the spindle head 2 from the uppermost tool change station A toward a lower machining region. Upon downward movement of spindle head 2 from the tool change position A, roller 29 on the operation lever 25 disengages from cam 31, thereby the lever 25 being rotated clockwise in FIG. 3 under the action of spring 21 until it strikes against stopper bolt 26a. As a result, draw bar 17 is elevated and at the same time, the engageable portions of clampers 24 are engaged with the engageable head portion 16a of the related tool 16 in the mounting bore 24a and the portion 16a is drawn into the reduced bore 14a for holding the tool 16 at the clamped position.

With the foregoing downward movement of spindle head 2 from the said tool change position A for finishing the clamp of the related tool 16 as shown in FIG. 3, a sensor, not shown, senses this state for actuation of drive motor 11 to rotate drive pulley 12 and driven pulley 9, resulting in rotating the spindle 7 in the direction of an arrow. While keeping this state. the spindle head 2 is elevated and lowered within the machining range and the tool 16 held by spindle 2 executes a machining operation relative to the work M. During execution of the above machining job, motor 87 of change unit 59, FIG. 9, is kept de-energized and thus halted. Therefore, the cylinder cam 88 is halted in the state shown in FIG. 9. Therefore, cam lever 89 of elevating unit 82 is rotated upwards and change shaft 60 is brought to the uppermost position shown in FIG. 9. At this moment, follower pinion 99 of rotation unit 94 is out of meshing with intermediate gear 95 and is kept at a raised position. However, one of the teeth grooves of the follower pinion 99 is kept in engagement with the projecting ridge 100a of motion checker 100 and prevented from free rotation. Cam lever 102 of arm-closing and opening unit 101 is rotated in a counter clockwise direction in FIG. 9 and contact bolt 105 will act to lower the operation shaft 76 against the action of spring 81. By this downward pressure movement of operation shaft 76, operating member 75 of change head 62 is lowered, and therewith, engageable pieces 79 are also lowered, thereby change arms 68 being unlocked at the gripping position. At the same time, cam followers 78 exert pressure upon cam surfaces 71a of cam pieces 71 against the action of gripping spring 74, thereby one side pair of change arms 68 being in an open state ready to grip the tool 16 of the spindle 7.

On the other hand, during execution of the machining job, main parts of the magazine 35 operate in the following manner:

Indexing motor 45 operates so that, by the motor shaft 45a, rotatable shaft 38 and plate 42 are rotated so that the tool 16 of spindle 7 and the tool pot 36 holding the tool 16 to be next succeedingly indexed are indexed to the indexing station C. When the said tool pot 36 is indexed at the station C, the upper portion of the pot under consideration enters into reception groove 53 and the engageable groove 36a of the pot is brought into engagement with engageable flange 54. Thereafter, transfer motor 56 is operated so as to rotate crank 57 by half a revolution, thereby crank pin 58 causing the transfer member 52 to shift advancingly towards main shaft 7. By this operation, the tool 16 mounted in the pot 36 under consideration is shifted to tool 16 change station B shown in FIG. 11, thereby the tool under consideration being positioned in a downwardly directed state.

Upon execution of a machining job with the tool 16 at main shaft 7 and an instruction for a tool change operation as a preparation for the next succeeding machining, elevating motor 4 is actuated at first so as to rotate the screw shaft 5, by which spindle head 2 is elevated towards the upper most tool-change station A, thereby the spindle head 2 being elevated from the machining region. Then, when the sensor senses this state, the operation of drive motor is halted, thereby the rotation of spindle 7 as well as tool 16 related therewith being stopped.

When the spindle head 2 is elevated to the tool change position A, the roller 29 on operation lever 25 is brought into contact with cam 31, thereby the operation lever being rotated counterclockwise in FIG. 3 against the action of spring 21 and the pin 28 on the lever 25 acting upon draw bar 17 to move it downwards. With this forced downward movement of the draw bar 17, the clampers 24 are also moved downwards, thereby the engageable end portions 24a of the latter being out from the reduced bore 14a and moving into a slightly enlarged recess-like portion 14d, for disengaging from the engaging small necked head 16a of the tool 16 under consideration and for releasing the clamp thereof. In this case, however, the laterally extending stop pin 33 backed up with spring 34 is kept in contact with the small head 16a of the tool which is thus held clamped, without dropping out from the positioning tapered bore 15.

Figure 11:
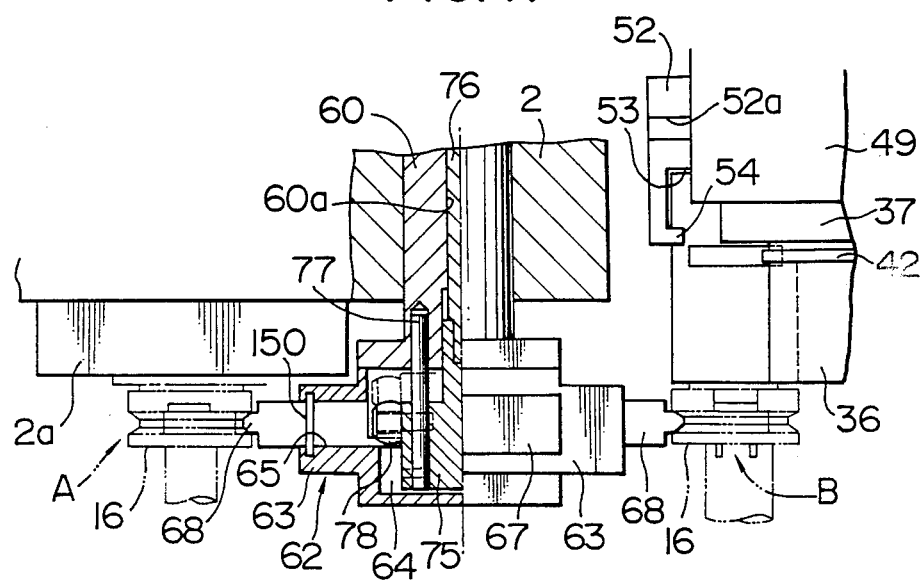
FIG. 11 is a section view taken along a broken section line XI—XI shown in FIG. 10.

When the spindle head 2 is elevated as was referred to hereinbefore, the other arm pair 68 arranged at the opposite side, as shown in FIG. 11, are elevated to the position B and assume an open state ready to grip the tool 16 held by the pot 36.

With elevational movement of spindle head 2 to the tool change station A, drive motor 87 is actuated and its output shaft 87a will make a complete revolution in the direction shown by an arrow. With this rotation of the shaft 87a, rotatable shaft 85 and cylinder cam 88 are rotated. With this rotational movement of cylinder cam 88, the end face cam 108 will act at first and as shown in FIG. 17 to lower cam follower 107, thereby cam lever 102 being rotated under the action of spring 81 and operation shaft 76 being elevated by the action of spring 81. With rise of operation shaft 76, operating member 75, cam followers 78 and engageable pieces 79 are elevated, thereby change arms 68 being closed toward each other under the action of grip springs 74. As a result, gripper pieces 70 of one side pair of change arms 68 are brought into engagement with grooves 16c of the tool 16 for spindle 7 to hold the tool under the spring action at 74. With upward movement of engageable pieces 79, inclined surfaces 79a of engageable pieces 79 are brought into engagement with the outer corners of now closing change arms 68 for urging the latter towards the closing position, so as to provide a symmetricity between these arms relative to the centering line thereof. Finally, at this stage, these related change arms 68 are locked in the tool-gripping state.

Thereafter, when the cylinder cam is further rotated, cam groove 88a will act to lower the cam follower 93 of cam lever 89 which is thereby rotated downwards and to lower the change shaft 60 to its lowest position. As a result, one side change arm pair 68 operate to draw out completely the tool 16 from the tool-mounting, tapered bore 15 of spindle 7, while the other side change arm pair, equally denoted with 68, operate to draw out completely a tool 16 from the tool-mounting recess or bore 36c of tool pot 3. In the draw-out operation of tool 16 from tapered bore 15, the engaging head 16a of tool 16 under consideration can be disengaged from holding pressure contact with stop pin 33, only by applying a forced downward pressure onto the head 16a of related tool 16.

With the downward movement of change shaft 60, follower pinion 99 is brought into engagement with intermediate gear 95. Since, in this case, free rotational movement of the follower pinion 99 is prevented by the rotation checker 100, the engagement of pinion 99 with gear 95 can be positively realized and assured.

With downward movement of change shaft 60, the upper end of operation shaft 76 is disengaged from pressure contact with the bolt 105 and the shaft 76 is held at the raised position under the action of spring 81. Thereupon, with rotational movement of rotative shaft 85, the roller 98 on prime mover wheel 97 is brought into successive engagement with peripheral recesses 96a on Geneva wheel 96, thereby the latter and intermediate gear 95 being stepwise driven.

With stepwise rotation of the intermediate gear 95, the follower pinion 99 will make half a revolution for each of such steps, so as to bring the tool 16 drawn out from the spindle 7 to a position directly below the tool-mounting bore 36c of tool pot 36 situated at the tool change station B. At the same time, the tool 16 drawn out from the pot 36 is transferred to an opposing position directly below the tool-mounting tapered bore 15 of the spindle 7. With further revolution of cylinder cam 88, cam groove 88a acts on the cam follower 93, to elevate it so as to rotate cam lever 89 upwards, thereby raising the change shaft 60. In this way, the tool 16 drawn out from the spindle 7 is introduced into tool-mounting recess or bore 36c of tool pot 36, while other tool 16 drawn out from tool pot 36 will be introduced into the tool-mounting tapered bore 15 of spindle 7.

When the tool has been introduced in the tapered bore 15, the engageable small head portion 16a of tool 16 will push the lateral stop pin 33 back against the action of the back-up spring 34 and be brought finally into engagement therewith.

When the other tool 16 is introduced in the tool-mounting bore 36c, the engageable small head 16a of tool 16 is prevented from slipping out therefrom by means of a stop means, not shown, similar to the stop pin 33.

With further rotational movement of cylinder cam 88, the cam surface 108a of end cam 108 elevates the cam follower 107 for rotating cam lever 102, thereby the contact bolt 105 on cam lever 102 lowering the operation shaft 76 downward. By this forced lowering movement of operation shaft 76, the operating member 75 is also lowered, thereby the engageable members 79 being lowered for unlocking the change arms 68 and cam followers 78 being also lowered for opening the change arms 68. In this way, both side change arm pairs 68 release the gripping of tools 16.

In this case, it should be noted that the tools 16 inserted in respective tool mounting bores or recesses 15 and 36c are firmly in position by engagement with stop pin 33 or the like holding means, and a definite slipout-proof action is positively assured. Thereafter, the spindle head 2 is again lowered to the machining range, the tool 16 positioned in mounting bore or recess 15 is clamped provisionally as before under the action of oppositely arranged clampers 24 and then used for machining as desired.

As for the tool magazine unit 35, transfer motor 56 is actuated so as to make crank 57 again rotate half a revolution for withdrawing the transfer member 52 towards the indexing station C. Then, indexing motor 45 is actuated to move rotation plate 42, so as to index the tool pot 36 including the tool 16 to be next exchanged to the indexing station C and the pot 36 is transferred to the tool change station B, as was referred to hereinbefore, to prepare for the next tool exchange job.

MERITS OF THE INVENTION

In the present invention, the spindle is provided with provisionally acting type clamp means. With use of this means, it is possible to provisionally clamp the tool introduced in the tool-mounting tapered bore or recess for providing a slipout-proof means provided at the lower end of said spindle. In this way, such a merit can be provided in the case of execution of tool-changing with use of tool change arms that the tool is clamped provisionally before gripping the tool by the change arms. Further, when the exchange arms have released the tool from the gripping state, the tool may be provisionally clamped. As a result, conventional use of clamp- and unclamp instruction signal during the tool change operation and, therefore, frequently appearing delays in the instructions can be avoided nd the change operation can be executed in a shorter time period. In addition, thanks to the provision of provisional clamp means for the tool for reliable holding thereof, a tool slipout proof effect may be provided and assured even if the spindle is of the downwardly directed type, and thus the tool change operation can be executed in a highly safe mode.

In the present invention, a tool change shaft, or briefly, change shaft, is provided on the spindle head, and during execution of machining, one side tool-head, change arms or briefly, change arms, are kept in a position ready for gripping the tool of the spindle, and when the spindle head is elevated to the tool change position, the other side change arms are kept in a position ready for gripping the tool on the tool pot. Therefore, in the case of tool change operation, when the spindle head is elevated to the tool change position, the change shaft is shifted, directly thereafter, in the axial direction, so as to instantly enter into the tool change operation, thereby the latter being carried out in a short time period. And, in spite of this short time tool change operation, and thanks to the provision of two pairs of change arms relative to the single change shaft, the tool of the spindle and the tool of the tool holding pot are changed in a mutual exchange operation. Thus, in this case, even if the spindle tool must be supplied with various tools in succession, the overall structure of the machine can be made in a highly simplified mode, thus providing an economical advantage over conventional comparative machine structure.

In the foregoing embodiment of the invention so far shown and described, an example of the vertical type machining center has been employed. It should be noted that the invention can be embodied in a horizontal type machining center, a boring or drilling machine and the like. As a further example, the invention can be applied to tool change apparatuses, having a column fitted with a tool change shaft and tool change appliances, by making slight modifications from the foregoing embodiment shown and described. Therefore, these further embodiments and modifications which may easily occur to those skilled in the art are included in the gist of the invention, however, without departing from the scope of the appended claims.

I claim:

1. A tool change apparatus for a machining center and the like, comprising in combination:
   a column;
   a spindle head slidably mounted on said column;
   a spindle rotatably mounted in said spindle head and having an axial bore extending therethrough;
   a draw bar slidably disposed in and extending through said axial bore;
   one end of said axial bore having tool reception bore means for reception of a tool, said draw bar including clamping means for, when said draw bar moves slidingly in one direction, clamping a tool in position in said tool reception bore means, and, when said draw bar moves slidingly in the opposite direction, releasing the tool from the tool reception bore means;
   a tool magazine unit mounted on said column and comprising a plurality of tool mounting pots for provisionally holding respective tools and for selectively shifting these tools to a predetermined tool change station;
   a tool change shaft mounted on one of said spindle head and said column and extending parallel to said spindle at an intermediate position between said spindle and one of the tool pots situated at said tool change station, said tool change shaft being rotatable around its own axis and also shiftable in the direction of its length;
   a pair of tool change arms provided on said tool change shaft for holding a tool to be changed;
   operating means including an operating shaft extending shiftably through said tool change shaft axially thereof for converting shifting movement of the operating shaft into closing and opening movements of said tool change arms;
   a Geneva wheel mechanism for rotatingly and intermittently driving said tool change shaft;
   a first cam mechanism for shifting said tool change shaft in the axial direction thereof;
   a second cam mechanism for shifting said operating shaft in the axial direction thereof;
   a single motor driving said Geneva wheel mechanism and said first and second cam mechanisms; and
   provisional clamp means adjacent said tool reception bore means for engaging and releasably holding a tool in said tool reception bore means.

2. The tool change apparatus of claim 1 wherein said first cam mechanism includes a cylinder cam and said second cam mechanism includes an end face cam provided on one axial end surface of said cylinder cam.

3. The tool change apparatus of claim 2 wherein said cylinder cam is rotatable about a central axis parallel to the axis of said tool change shaft, said cylinder cam having a peripheral surface having a cam groove therein, and wherein the apparatus further comprises a cam lever pivotably mounted on said spindle head, engagement means to keep a tip end of the cam lever in engagement with said tool change shaft, and a cam follower provided on said cam lever and engaging said cam groove, said cam groove, cam lever, engagement means and said cam follower jointly constituting said first cam mechanism.

4. The tool change apparatus of claim 2 further comprising a second cam lever pivotably mounted on said spindle head, second engagement means to keep a tip end of the second cam lever in engagement with said operating shaft, and a second cam follower provided on the second cam lever and being in resilient engagement with said end face cam, said second cam lever, second engagement means and second cam follower jointly constituting said second cam mechanism.

5. The tool change apparatus of claim 1 wherein said provisional clamp means is a stop means resiliently urged into said axial bore so as to be engageable with a tool head on the root end of a tool inserted into the tool reception bore means.

6. A tool change apparatus for a machining center and the like, comprising in combination:
   a column;
   a spindle head slidably mounted on said column;
   a spindle rotatably mounted in said spindle head and having an axial bore extending therethrough;
   a draw bar slidably disposed in and extending through said axial bore;
   one end of said axial bore having tool reception bore means for reception of a tool, said draw bar including clamping means for, when said draw bar moves slidingly in one direction, clamping a tool in position in said tool reception bore means, and, when said draw bar moves slidingly in the opposite direction, releasing the tool from the tool reception bore means;
   a tool magazine unit mounted on said column and comprising a plurality of tool mounting pots for provisionally holding respective tools and for selectively shifting these tools to a first predetermined tool change station;
   a tool change shaft extending through said spindle head and parallel to said spindle at an intermediate position between said spindle and one of the tool pots situated at said first predetermined tool change station, said tool change shaft being rotatable around its own axis and also shiftable in the direction of its length;
   two pairs of closable and openable tool change arms pivotally mounted on the tool change shaft for holding a tool to be changed, one pair being on the opposite side of said tool change shaft from the other with the two arms of the one pair extending outwardly substantially in the opposite direction from the two arms of the other pair, said spindle head being movable to a second predetermined tool change station, said tool change shaft being movable to move said tool change arms to a position in which one pair of arms is ready to grip a tool mounted on the spindle and the other pair of arms is ready to grip a tool mounted in the tool pot which has been indexed to and provisionally held at the first tool change station;

spring means urging the arms of each pair of tool change arms in mutually closing directions;

operating means including an operating shaft extending shiftably through said tool change shaft axially thereof, and cam means provided between said operating shaft and each of said tool change arms for converting shifting movement, in one direction of the operating shaft movement, into opening movement of the tool change arms against the force of said spring means; and engaging means provided on said operating shaft and having inclined engaging surface means for acting on and engaging the tool change arms, upon shifting movement of the operating shaft in the direction opposite to said one direction, to lock the tool change arms in a closed position.

7. The tool change apparatus of claim 6 wherein said clamping means comprises resilient clamper arms fixedly attached to one end of said draw bar near said tool reception bore means, said arms having engageable end portions for engaging a tool head and wherein said axial bore has a slightly enlarged recess-like portion located between the axial bore and the tool reception bore means, said recess-like portion functioning to allow said resilient clamper arms to expand outwardly when the draw bar is shifted to cause the engageable end portions of the clamper arms to move into the recess-like portion, thereby to release the tool head from the engageable end portions.

8. The tool change apparatus of claim 7 wherein said axial bore has a long main portion, a return spring in said long main portion and engaging said draw bar for urging said draw bar in a direction away from said tool reception bore means, and said axial bore has a reduced size bore portion extending from said main portion for constricting said resilient clamper arms into the clamping state, said reduced bore portion being connected to said recess-like portion.

9. A tool change apparatus for a machining center and the like, comprising in combination:

a column;

a spindle head slidably mounted on said column;

a spindle rotatably mounted in said spindle head and having an axial bore extending therethrough;

tool reception bore means at one end of said axial bore for reception of a tool, said tool reception bore means having means for releasably clamping a tool;

a tool magazine unit mounted on said column for holding tools therein and for selectively shifting these tools to a predetermined tool change station;

a tool change shaft mounted on said spindle head and extending parallel to said spindle between said spindle and said tool change station, said tool change shaft being rotatable around its own axis and also shiftable in the direction of its length;

two pairs of closable and openable tool change arms pivotally mounted on the tool change shaft for holding a tool to be changed, one pair being on the opposite side of said tool change shaft from the other with the two arms of the one pair extending outwardly substantially in the opposite direction from the two arms of the other pair;

operating means including an operating shaft extending shiftably through said tool change shaft axially thereof for converting shifting movement of the operating shaft into closing and opening movements of said tool change arms;

a Geneva wheel mechanism for rotatingly and intermittently driving said tool change shaft;

a first cam mechanism for shifting said tool change shaft in the axial direction thereof;

a second cam mechanism for shifting said operating shaft in the axial direction thereof;

a single motor driving said Geneva wheel mechanism and said first and second cam mechanisms; and provisional clamp means adjacent said tool reception bore means for engaging and releasably holding a tool in said tool reception bore means.

10. The tool change apparatus of claim 9 wherein said first cam mechanism includes a cylinder cam and said second cam mechanism includes an end face cam provided on one axial end surface of said cylinder cam.

11. The tool change apparatus of claim 10 wherein said cylinder cam is rotatable about a central axis parallel to the axis of said tool change shaft, said cylinder cam having a peripheral surface having a cam groove therein, and wherein the apparatus further comprises a cam lever pivotably mounted on said spindle head, engagement means to keep a tip end of the cam lever in engagement with said tool change shaft, and a cam follower provided on said cam lever and engaging said cam groove, said cam groove, cam lever, engagement means and said cam follower jointly constituting said first cam mechanism.

12. The tool change apparatus of claim 10 further comprising a second cam lever pivotably mounted on said spindle head, second engagement means to keep a tip end of the second cam lever in engagement with said operating shaft, and a second cam follower provided on the second cam lever and being in resilient engagement with said end face cam, said second cam lever, second engagement means and second cam follower jointly constituting said second cam mechanism.

13. The tool change mechanism of claim 9 further comprising spring means urging each of the arms of the pairs of tool change arms in a mutually closing direction, said operating means including cam means provided between said operating shaft and each of said tool change arms for converting shifting movement, in one direction of the operating shaft movement, into opening movement of the tool change arms against the force of said spring means; and engaging means provided on said operating shaft and having inclined engaging surface means for acting on and engaging the tool change arms, upon shifting movement of the operating shaft in the direction opposite to said one direction, to lock the tool change arms in a closed position.

14. The tool change mechanism of claim 9 wherein said spindle head is movable to a second predetermined tool change station for carrying out a tool change, said tool change shaft being positioned intermediate said first and said second tool change stations and having one pair of tool change arms positioned to grip a tool attached to the spindle and the other pair of tool change arms positioned to grip a tool which is held in the first tool change station.

* * * * *